United States Patent [19]
McHugh, III

[11] Patent Number: 5,792,523
[45] Date of Patent: Aug. 11, 1998

[54] KRYPTON GAS MIXTURE FOR INSULATED WINDOWS

[75] Inventor: Manus McHugh, III, Devon, Pa.

[73] Assignee: AGA Aktiebolag, Lidingo, Sweden

[21] Appl. No.: 616,098

[22] Filed: Mar. 14, 1996

[51] Int. Cl.$^6$ .......................... E06B 3/24; C01B 23/00
[52] U.S. Cl. .................. 428/34; 52/786.1; 156/109; 423/262
[58] Field of Search .................... 428/34; 156/107, 156/109; 52/786.1; 423/262, 210; 422/190; 436/153; 73/19.01; 252/372

[56] References Cited

U.S. PATENT DOCUMENTS

| | | | |
|---|---|---|---|
| H975 | 11/1991 | Selkowitz et al. | 52/172 |
| 1,478,036 | 12/1923 | Jones . | |
| 2,040,107 | 5/1936 | Schlitt | 62/22 |
| 2,094,381 | 9/1937 | Slayter | 20/56.5 |
| 2,284,662 | 6/1942 | Kahle | 62/22 |
| 2,793,507 | 5/1957 | Hnilicka | 62/22 |
| 3,169,845 | 2/1965 | Kornemann et al. | 62/18 |
| 3,596,471 | 8/1971 | Streich | 62/22 |
| 3,609,983 | 10/1971 | Lofredo et al. | 62/22 |
| 3,683,974 | 8/1972 | Stewart et al. | 141/4 |
| 3,754,406 | 8/1973 | Allam | 62/41 |
| 3,779,028 | 12/1973 | Schuftan et al. | 62/22 |
| 3,940,898 | 3/1976 | Kaufman | 52/400 |
| 4,357,187 | 11/1982 | Stanley et al. | 156/107 |
| 4,393,105 | 7/1983 | Kreisman | 428/34 |
| 4,401,448 | 8/1983 | La Clair | 62/22 |
| 4,459,789 | 7/1984 | Ford | 52/656 |
| 4,485,603 | 12/1984 | Derner et al. | 52/398 |
| 4,520,611 | 6/1985 | Shinju et al. | 52/789 |
| 4,568,528 | 2/1986 | Cheung | 423/262 |
| 4,574,006 | 3/1986 | Cheung | 62/22 |
| 4,623,524 | 11/1986 | Someya et al. | 423/245 |
| 4,831,799 | 5/1989 | Glover et al. | 52/172 |
| 4,848,138 | 7/1989 | Marshall | 73/40.7 |
| 4,928,448 | 5/1990 | Phillip | 52/174 |
| 4,941,302 | 7/1990 | Barry | 52/171 |
| 4,994,309 | 2/1991 | Reichert et al. | 428/34 |
| 5,007,217 | 4/1991 | Glover et al. | 52/172 |
| 5,027,574 | 7/1991 | Phillip | 52/171 |
| 5,080,146 | 1/1992 | Arasteh | 141/4 |
| 5,156,894 | 10/1992 | Hood et al. | 428/34 |
| 5,204,075 | 4/1993 | Jain et al. | 423/219 |
| 5,364,777 | 11/1994 | Spencer | 435/134 |
| 5,377,473 | 1/1995 | Narayan et al. | 52/790 |

*Primary Examiner*—Donald Loney
*Attorney, Agent, or Firm*—Pearne, Gordon, McCoy and Granger

[57] ABSTRACT

A mixture of noble gases having desirable insulative properties for use as a window fill gas is derived from an air separation process without substantial further separation or concentration of the noble gases in the mixtures. The mixture of noble gases is processed to form the fill gas using relatively economical catalytic oxidation processes and drying techniques to provide a suitable fill gas. The processed noble gas or fill gas may contain from about 89 to 95% krypton, 5 to 8% xenon and 0.5 to 2% contaminants including oxygen, nitrogen, hydrocarbons and other constituents typically found in air separation processing.

26 Claims, 3 Drawing Sheets

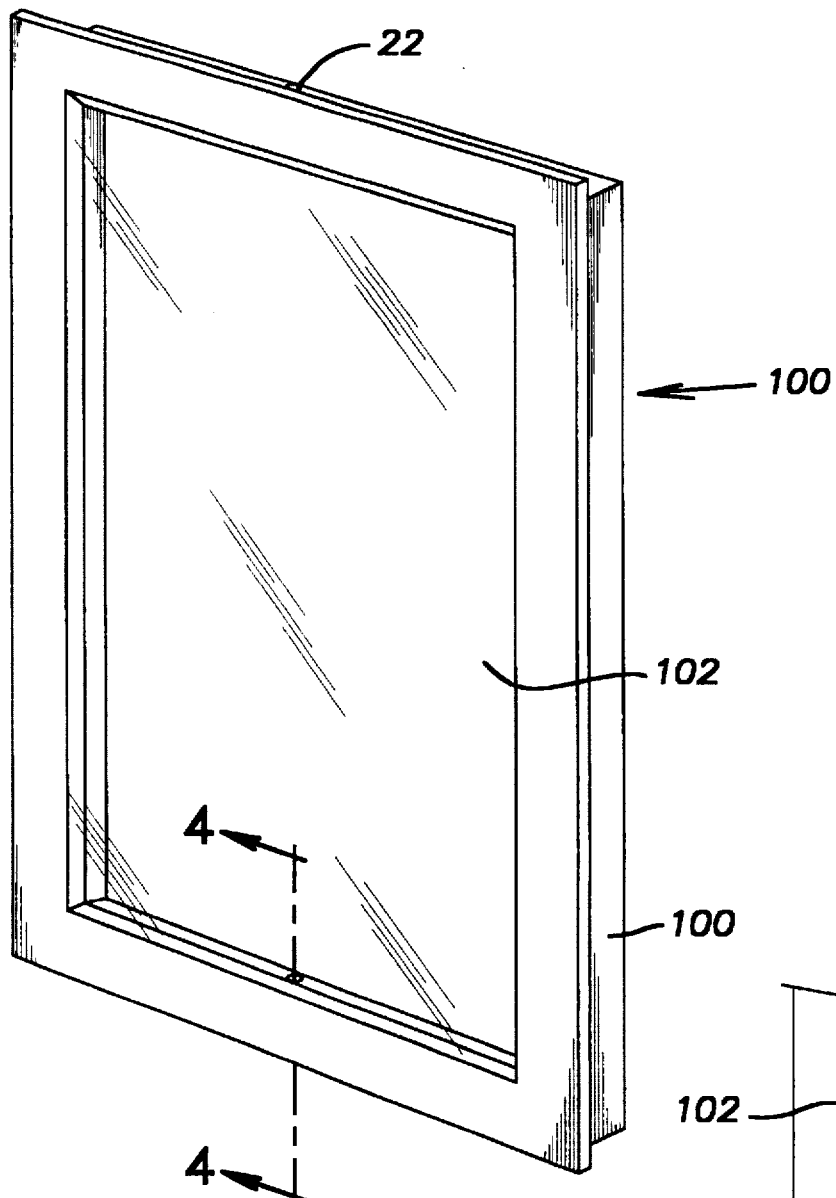
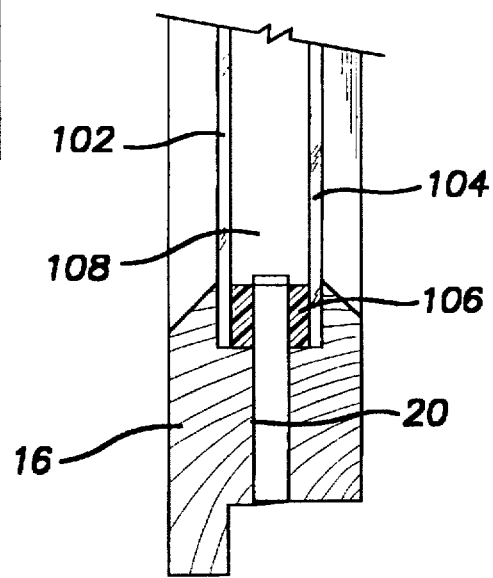
Fig.3
Fig.4

KRYPTON GAS MIXTURE FOR INSULATED WINDOWS

BACKGROUND OF THE INVENTION AND RELATED ART

The present invention relates to insulating gas systems, and more particularly, to an insulating gas for a gas filled insulating construction, such as an insulated glazing or a window, and to a method of producing such gas and the resulting construction or window. The invention has particular application to insulated glazings or windows, and it is described with specific reference to the same hereinafter.

Heating energy considerations have particularly promoted the use of multiple pane windows for residential homes, office buildings and commercial structures of all types because of their excellent insulative properties. The space between the panes is referred to as "dead air" space and is often filled with an insulating gas to further enhance the insulating characteristics.

Increased thermal resistance is desirable. Double glazed windows often referred to as R2 (a unit having a thermal resistance of 2 hr-ft$^2$ °F./BTU) are preferred over single glazed (R1) windows. Such thermal window assemblies are usually constructed by placing sealed, insulated glazing ("IG") units having the desired number of glazing layers in conventional window frames. "IG" is used in the art to refer to insulated glass units; however, because glazings may be comprised of materials other than glass, the term "IG" units as used herein will not refer to a specific material but to insulated glazing units generally. While the addition of further glazing layers to the IG unit provides a moderate gain in insulating performance, it also adds weight and bulk to the window and reduces the transmission of light which is undesirable.

Improvements in the thermal efficiency of windows have been made possible by the addition of a low conductance gas to the space between the glazings to reduce the conductive and convective heat transfer. For example, U.S. Pat. Nos. 4,459,789 and 3,683,974 disclose the use of various fluorocarbon gases, known collectively by the trademark "Freon," in a sealed window assembly. U.S. Pat. No. 4,393,105 generally teaches the use of argon and krypton to serve this purpose.

Statutory Invention Registration H-975 is directed to an insulated glazing unit or multiple pane windows which can attain about R5 to about R10 thermal performance at the center of the glass while having dimensions about the same as those of a conventional double glazed insulated glazing unit. SIR H-975 generally discloses gas fill mixtures ranging from 50% (Kr)–50% (Xe) to 100% krypton. SIR H-975 teaches the formulation of the gas mixtures by using pure krypton and pure argon and mixing the two to obtain the desired mixture. The term used herein for this process of mixing pure krypton gas with another gas to obtain a preferred ratio is "back-mixing". Back mixing generally refers to the process of mixing gasses (i.e. noble gasses) together after they have been extensively purified to concentrations significantly greater than their respective concentrations in the window fill gas composition.

U.S. Pat. Nos. 4,928,448 and 5,027,574 illustrate a thermally insulating window which is created by filling the space between two window panes with a gas exhibiting low thermal conductivity at a moderately low pressure. This increases the thermal insulating qualities of the window without the problems associated with evacuating the region to extremely low pressures. Although not mentioning xenon, these references disclose krypton as a type of low conductance gas. However, the focus of these references is filling windows under low pressure, and filling with trichloro-flouro-methane ($CCl_3F$), not krypton.

SUMMARY OF THE INVENTION

It has now been found that mixtures of noble gases having desirable insulative properties may be derived from more comprehensive gas separation processes without substantial further separation or concentration of the noble gases in the mixtures. Such mixtures of noble gases may be confined in gas impermeable containers to provide particularly effective insulating systems, such as insulating glazings or windows, without substantially increasing the concentration of the noble gases in the mixture.

The mixture of nobles gases may be an intermediate gas phase in the more comprehensive gas separation process or a substantially impure gas mixture that is typically further purified in the more comprehensive process to recover a component thereof. In accordance with the invention, the mixture of noble gases is processed using relatively economical catalytic oxidation processes and drying techniques to provide a suitable fill gas. The more expensive cryogenic separation processing used in connection with prior art argon, krypton and krypton/xenon back-mixed systems may be avoided.

The comprehensive processes of air separation have been found to provide particularly good sources of the desired mixtures of noble gases. In air separation processing, rare gas streams from which krypton is usually purified, the so-called "crude" krypton gas streams or "crude" herein, have been found to be especially effective as insulating gases in glazing or window applications. Such crude krypton streams may contain from about 89 to 95% krypton, 5 to 8% xenon and 0.5 to 2% contaminants including oxygen, nitrogen, hydrocarbons and other constituents typically found in air separation processing. (Herein, all composition percentages are by weight unless otherwise indicated by the context of usage.) For convenience, the invention is described hereinafter with particular reference to the use of such rare gas streams or crude krypton gas mixtures derived from air separation processes.

In accordance with the invention, the crude krypton gas mixture is catalytically processed to remove hydrocarbon and oxygen constituents and dried to the dew point of the expected service temperature to form a "processed crude" or fill gas. As indicated, it is not necessary to further cryogenically separate components or purify the noble gases in the crude krypton gas mixture. The absence of such further cryogenic processing greatly reduces the cost of the insulating gas as compared with back-mixing prior art processes.

The fill gas in accordance with the invention contains from 92 to 98% krypton, 2 to 8% xenon and up to about 0.05% contaminants including those noted above with the exclusion of oxygen which will be substantially completely removed in the catalytic processing. More preferably, the fill gas contains from 94 to 96% krypton, 4 to 6% xenon and up to about 0.025% contaminants, and, most preferably, the fill gas contains about 95% krypton, about 5% xenon and less than about 0.001% contaminants. In all cases, the fill gas water content is reduced to less than that corresponding with the water content at the dew point of the lowest service temperature or temperature the window will be exposed to during its expected use.

Insulated glazings or windows containing a fill gas in accordance with the invention indicate superior thermal and

BRIEF DESCRIPTION OF THE DRAWINGS

FIG. 3 is a perspective view of an insulating double glazed window assembly containing an insulating fill gas mixture in accordance with the present invention; and FIG. 4 is a cross section taken along the line 3—3 in FIG. 3.

DETAILED DESCRIPTION OF THE DRAWINGS

Figure 1:
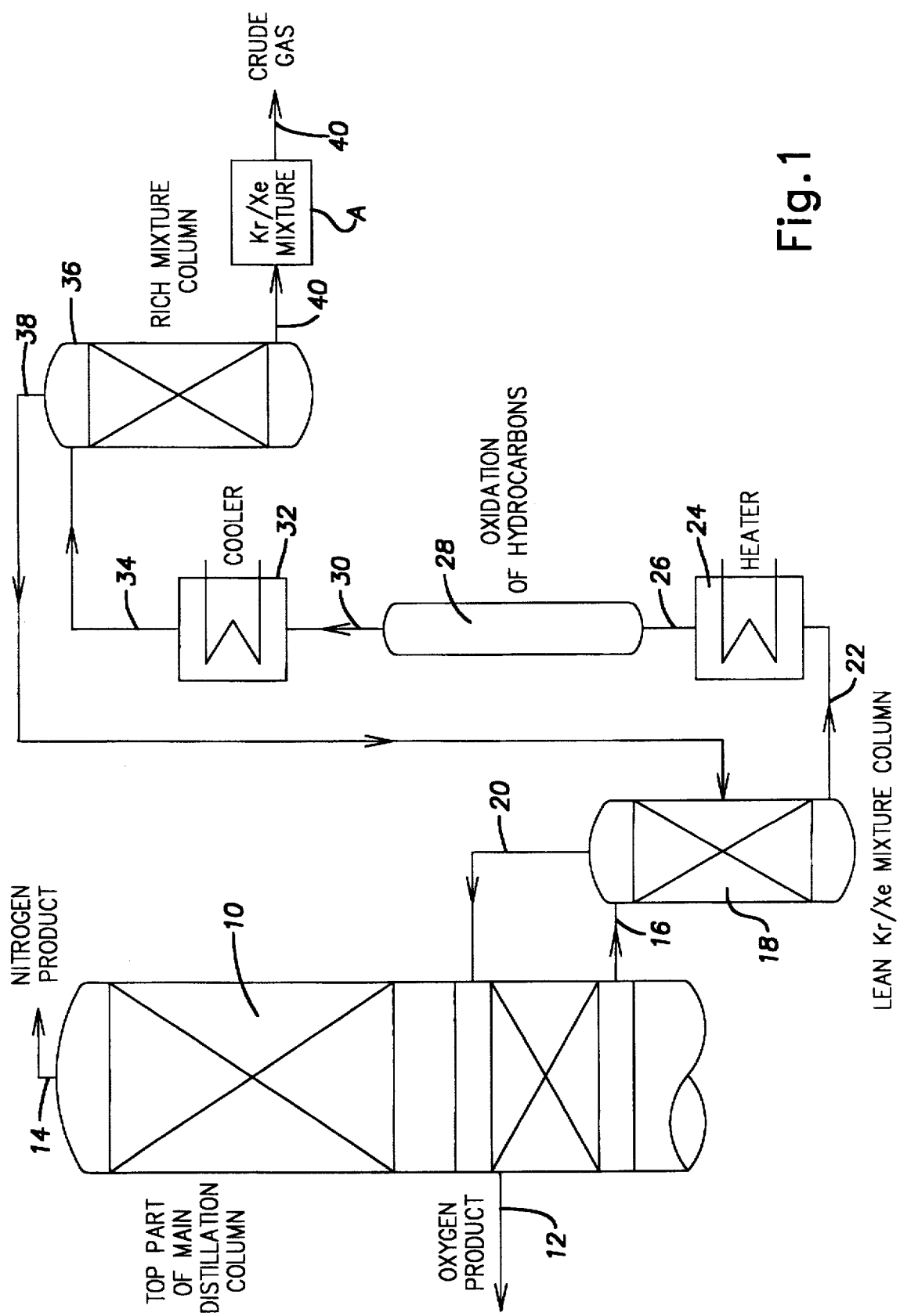
FIG. 1 is a flow diagram of an air separation process which is a source of a rare gas stream or crude krypton gas stream for use in the present invention.

Referring to FIG. 1, a rectification portion of a main distillation column 10 is shown in a typical air separation processing arrangement. The column 10 may be a double Lined column or any other conventional cryogenic separation column as are well known in the art. The oxygen product is withdrawn through line 12 and the nitrogen product is withdrawn through line 14.

For purposes of reflux and further oxygen recovery, a liquid flow of primarily oxygen is withdrawn through line 16 and introduced into the top of distillation column 18 for further separation of krypton and xenon gas constituents together with contaminants. The temperature gradient in the column 18 may be about 20° C., the temperature at the top of the column being −160° C. and at the bottom of the column −140° C. A reflux flow of oxygen passes from the top of the column 18 through line 20 into the column 10. The reflux flow in line 20 may be 3 or 4 times the through flow in the column 10.

A bottom product withdrawn from the column 18 through line 22 is enriched in krypton and xenon as well as hydrocarbon contaminants. The bottom product is heated to about 400° C. in heater 24 and then passed via line 26 to reactor 28 for oxidation of the hydrocarbon contaminants at temperatures in the range of 400° to 500° using known techniques and catalysts such as platinum or pallidium. Following the oxidation of the hydrocarbons, a hydrocarbon-lean gas is withdrawn from the reactor 28 through line 30, cooled in the cooler 32 to about −140° C. and passed via line 34 to the top of the distillation column 36.

The top of the column 36 is at a temperature of about −140° C. and the bottom is at about −130° C. A top product from the column 36 is further concentrated in oxygen and withdrawn through line 38 for return to the column 18. A rare gas stream or liquid bottom product is withdrawn from the column 36 through line 40. The liquid bottom product withdrawn through line 40 may contain about 95% krypton and about 5% xenon and less than about a total of 2% of oxygen, nitrogen and typical air separation contaminants.

The liquid bottom product withdrawn through line 40 upon warming to ambient temperature and pressure as schematically shown at "A" in FIG. 1 provides the crude krypton process gas useful in accordance with the invention. However, the foregoing air separation processing is merely illustrative of numerous air separation techniques and operating conditions from which the crude krypton process gas may be obtained. As a result of such variations, the derived crude process gas may vary approximately in composition from 89 to 95% krypton, from 5 to 8% xenon and from 0.5 to 2.0% total of oxygen, nitrogen and typical air separation contaminants. For illustration purposes, the crude krypton process gas in the line 40 is assumed to have the following composition.

| Crude Krypton Process Gas | |
| --- | --- |
| Kr | 94.52% |
| Xe | 5.0% |
| $N_2$ | .4% |
| $O_2$ | .05% |
| $CH_4$ | .01% |
| $CO_2$ | .01% |
| $H_2O$ | .01% |
| $SF_6$ | .01% |
| $CF_4$ | .01% |

Figure 2:
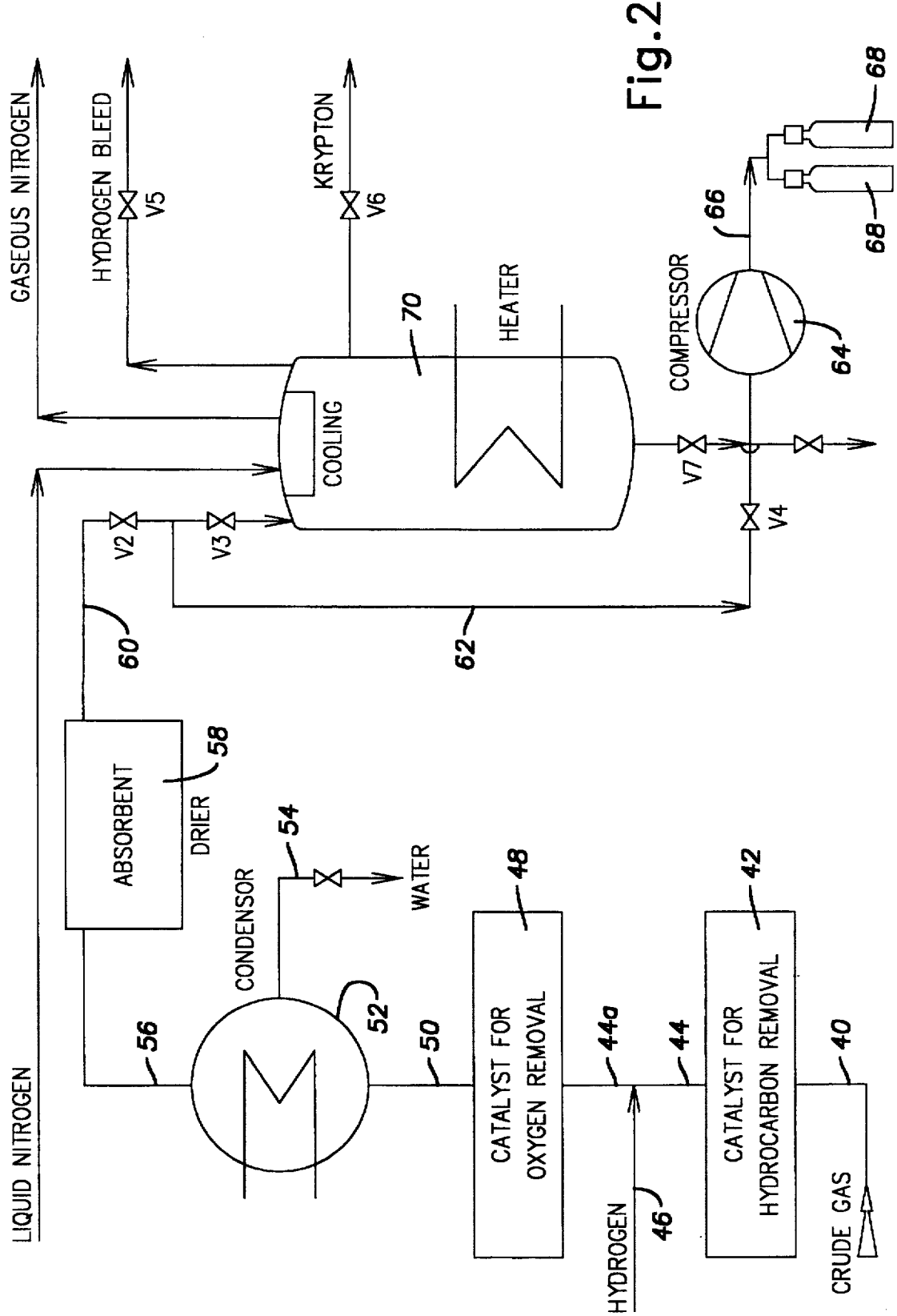
FIG. 2 is a diagram of the method for processing the crude krypton gas stream from FIG. 1 to produce a processed crude or fill gas mixture in accordance with the present invention.

Referring to FIG. 2, a continuation of the line 40 is shown containing the crude krypton process gas. It should be appreciated that the crude process gas may be processed in accordance with the invention at a site remote of the air separation process from which it is derived. Herein a continuous type of processing is shown for clarity, the gas in the line 40 is passed to reactor 42 for catalytic hydrocarbon removal. In the reactor 42 the gas is heated to a temperature of 400° to 500° C. in the presence of known molecular sieves and oxidation catalysts such as platinum, palladium or rhodium which may be on a support such as aluminum oxide. Excess oxygen may be added to assure combustion. The hydrocarbons react with oxygen to form water and carbon dioxide. A hydrocarbon-lean gas stream is withdrawn from the reactor 42 via line 44. In preparation for oxygen removal, hydrogen is added via line 46 to the hydrocarbon-lean gas stream in line 42, and the gas stream including the added hydrogen proceeds via line 44a to reactor 48 for catalytic oxygen removal at a temperature of about 500° C. More particularly, the oxygen in the gas stream is reacted with the hydrogen to form water. In this reaction, substantially all of the oxygen present will be reacted and an oxygen-free gas stream is withdrawn from the reactor 48 via line 50.

The oxygen-free gas stream in line 50 is passed to heat exchanger 52 for cooling to about 40° C. At this temperature, the bulk of the water present is condensed from the gas stream and withdrawn from the heat exchanger through line 54.

The partially dehydrated gas stream is withdrawn from the heat exchanger 52 via line 56 and introduced into drier 58 for further water removal. In the drier 58, zeolites may be used to remove water from the gas stream in a known manner. The gas stream is dried to a water content corresponding with the expected dew point service requirement, e.g. the lowest temperature to which the window will be exposed, to form the processed crude or fill gas in accordance with the invention. For convenience of illustration, the fill gas may be withdrawn from the drier 58 through line 60 and, by appropriate manipulation of valves $V_2$ and $V_3$ directed through line 62 to compressor 64. The fill gas is compressed to a convenient handling pressure, e.g. 70 bar, and passed via line 66 to tanks 68 for storage and/or transportation. The composition of the fill gas may be as follows.

| Processed Crude or Fill Gas | |
|---|---|
| Kr | 94.974% |
| Xe | 5.024% |
| $N_2$ | .0005% |
| $O_2$ | .0002% |
| $CH_4$ | .00005% |
| $CO_2$ | .0003% |
| $H_2O$ | .0002% |
| $SF_6$ | .0001% |
| $CF_4$ | .0001% |

The relatively minor amounts of contaminants including nitrogen and oxygen are not detrimental to the improved insulative properties of the fill gas in accordance with the invention. In comparison with the fill gas, it should be appreciated that pure krypton may be obtained by further cryogenic separation of the gas in line 60 in the distillation column 70. Such separation requires significant amounts of additional energy and is only warranted when special applications for pure krypton are to be supplied.

Referring now to the FIGS. 3 and 4, a window assembly or insulated glazing unit 100 of conventional construction comprises an outer coated sheet of glass 102 and an inner coated sheet of glass 104 spaced from one another in face-to-face parallel relation by panel divider 106 to create an air or gas space 108 therebetween. The spaced glass sheets are mounted within a surrounding wall assembly 110.

Referring to FIG. 4, at least one sealable tubular insert or conduit 20 extends through the bottom portion of the wall assembly 110 for communication with the air space 108. The conduit 20 forms an access hole into the air space 108 for dehydration and also allows for filling of the air space with a gas. Conventionally, gas filled windows are filled through this hole. Usually, there is a second similar conduit (not shown) in the top portion of the wall assembly 110 so that gas within the air space may be displaced by the fill gas introduced into the conduit 20. After the air space 108 is filled with the fill gas, the conduits 20 are sealed to trap the fill gas therein.

The filling process and conditions are known in the art, and low pressure fills, e.g. less than an atmosphere, may be used to further reduce conductive and convective heat transfer. In connection with such low conductance fill gases and fill techniques, the teachings of U.S. Pat. Nos. 5,027,574, 4,928,448, 4,459,789 and 3,683,974 relating to fluorocarbon fill gases and U.S. Pat. Nos. 5,080,146 and 4,393,105 relating to argon, krypton and krypton back-mixed fill gases are incorporated herein.

During the formation of the window assembly the dimension of the gas space is controlled to maintain a predetermined distance between the outer glass sheet 12 and the inner glass sheet 14. The preferred distance is 0.125 inch to 0.375 inch between the inner glass sheet and the inner glass sheet 14 with a preferred separation of approximately 0.25 inch. This range of distance between the outer glass sheet 12 and the inner glass sheet 14 provides benefits associated with a smaller gas space. Smaller gas spaces typically have poor thermal insulating characteristics, however, a larger air space increases the risk of glass breakage due to air/gas space temperature and pressure variations. The distance between the glass sheets may be narrower than that which is normally used in the construction of air filled units because the U-value of the window assembly is sufficiently decreased by filling the air space with the fill gas in accordance with the invention. The utilization of krypton gas in the gas space of the present invention provides for high insulation within a smaller than normal gap due to the fill gas being significantly less thermally conductive than air as shown in the following table.

The fill gas in accordance with the invention has desirable thermal and noise characteristics as compared to either the crude or the pure forms. The reported data illustrate that the processed crude is expected to give superior thermal and noise characteristics.

TABLE I

| Gas | Density $Kg/M^3$ | Thermal Conductivity W/M/°K. | Sonic Velocity Meter/Sec. |
|---|---|---|---|
| Air | 1.2931 | 0.02779 | 337.24 |
| Argon | 1.7841 | 0.017744 | 313.31 |
| Krypton | 3.4274 | 0.00929 | 216.51 |
| Invention | 3.5779 | 0.00893 | 212.00 |
| Xenon | 5.3910 | 0.00561 | 172.37 |

As indicated by the data, the improvements of the fill gas in accordance with the invention are particularly advantageous in window applications where low thermal conductivity and noise transmission are desirable.

The above reported properties for the fill gas of the invention will display about ±1% range of values in accordance with composition variations. Therefore, the density will range from 3.5421 to 3.6137 $Kg/M^3$, the thermal conductivity will vary from 0.00884 to 0.00902 W/M/°K, and the sonic velocity will range from 209.88 to 214.12 meters/sec.

Radiative heat transfer is also a significant portion of heat transfer in a typical multi-glazed window. Low emittance coatings have been developed which reflect long wavelength infrared energy and reduce window heat transfer. The addition of a low-emittance (low-E) coating to a double glazed IG unit provides the thermal efficiency of triple glazing (R3) without the additional weight, bulk and complexity. It is desirable to combine the low-E technology with the gas mixtures of the present invention to thereby obtain a window which has superior thermal insulating characteristics. For example, U.S. Pat. No. 4,941,302, which is hereby expressly incorporated by reference in its entirety provides a multiple glass sheet insulating unit having a welded or fused glass, sealed peripheral edge. The unit comprises at least two glass sheets each having a low emissivity coating applied to their surfaces and a highly insulating gas filling the sealed space formed by the two sheets.

The present invention has been described in what is considered to represent its preferred embodiment. However, it should be noted that the invention can be practiced otherwise than as specifically illustrated and described without departing from its spirit or scope. For example, the fill gas of the invention may be used in applications primarily requiring similar density and inertness properties such as those of the krypton gas in a halogen light.

What is claimed is:

1. A method of processing a rare gas stream enriched in krypton and xenon to make a window fill gas without substantially increasing the maximum concentration of krypton and xenon during such processing beyond that in the window fill gas being formed comprising the steps of:

a) obtaining said rare gas stream from a more comprehensive gas separation process with the following composition:
      krypton—from about 89% to about 95%,
      xenon—from about 5% to about 8%, and contaminants—from about 0.5% to about 2%,
  said contaminants including oxygen, water and at least one lower hydrocarbon;
b) catalytically reducing the concentration of said at least one hydrocarbon in said rare gas stream with the formation of water to form a hydrocarbon-lean gas stream;
c) catalytically reducing the concentration of oxygen in the hydrocarbon-lean stream from step (b) to form an oxygen-free gas stream; and
d) drying said oxygen-free gas stream from step (c) to remove water and to form said fill gas with a dew point temperature lower than the expected service temperature of the window and the following composition:
  krypton—from about 92% to about 98%,
  xenon—from about 2% to about 8%, and
  contaminants—less than 0.05%.

2. The method of claim 1, wherein step (c) includes introducing hydrogen into the hydrocarbon-free gas stream from step (b).

3. The method of claim 2, wherein said contaminants also include one or more members selected from the group consisting of nitrogen, methane, ethane, ethylene, propane, carbon tetrafluoride and sulfur hexafluoride.

4. The method of claim 1, wherein step (b) includes contacting said rare gas stream with an oxidation catalyst.

5. The method of claim 4, wherein the oxidation catalyst is platinum, palladium or rhodium.

6. The method of claim 5, wherein said gas separation process is an air separation process including a distillation process and said rare gas stream is a side stream withdrawn from the distillation process.

7. The method of claim 6, wherein said distillation process includes a reflux stream provided by a reflux loop including a bottom liquid that is withdrawn to provide said rare gas stream.

8. The method of claim 7, wherein the krypton and the xenon in said fill gas are concentrated without rectification processing of the rare gas stream.

9. The method of claim 6, wherein the fill gas consists essentially of said rare gas stream.

10. The method of claim 6, wherein said fill gas consists essentially of 95% krypton, 5% xenon and less than 0.001% contaminants.

11. A method of filling a window gas space with a fill gas formed of a rare gas stream from an air separation process containing krypton and xenon without substantially increasing the maximum concentration of krypton and xenon beyond that in the rare gas stream comprising the steps of:
a) obtaining said rare gas stream from said air separation process with the following composition:
  krypton—from about 89% to about 95%,
  xenon—from about 5% to about 8%, and
  contaminants—from about 0.5% to about 2%,
  said contaminants including oxygen, water and at least one lower hydrocarbon;
b) catalytically reducing the concentration of said at least one hydrocarbon in said rare gas stream with the formation of water to form a hydrocarbon-lean stream;
c) catalytically reducing the concentration of oxygen in the hydrocarbon-lean stream formed in step (b) to form an oxygen-free stream;
d) dehydrating the oxygen-free stream formed in step (c) to form said fill gas having the following composition:
  krypton—from about 92% to about 98%,
  xenon—from about 2% to about 8%, and
  contaminants—less than 0.05%; and
e) filling said window gas space with said fill gas and hermetically sealing said window gas space.

12. The method of claim 11, wherein step (c) includes introducing hydrogen into the hydrocarbon-free gas stream from step (b).

13. The method of claim 12, wherein said contaminants also include one or more members selected from the group consisting of nitrogen, methane, ethane, ethylene, propane, carbon tetrafluoride and sulfur hexafluoride.

14. The method of claim 13, wherein step (b) includes contacting said rare gas stream with an oxidation catalyst.

15. The method of claim 14, wherein said air separation process includes a distillation process and said rare gas stream is a side stream withdrawn from the distillation process.

16. The method of claim 15, wherein said fill gas consists essentially of 95% krypton, 5% xenon and less than 0.001% contaminants.

17. A window having a window gas space filled with a fill gas formed of a rare gas stream from an air separation process containing krypton and xenon, said krypton and xenon being concentrated in said rare gas stream to form said fill gas without substantially exceeding the maximum concentration of krypton and xenon beyond that in the rare gas stream, said fill gas consisting essentially of from about 92% to about 98% krypton, from about 2% to about 8% xenon and less than 0.05% contaminants.

18. The window of claim 17, wherein said fill gas contains from about 94 to about 96% krypton, from about 4 to about 6% xenon and less than about 0.025% contaminants.

19. The window of claim 17, wherein said fill gas consists essentially of 95% krypton, 5% xenon and less than 0.001% contaminants.

20. The window of claim 18, wherein said contaminants include one or more members selected from the group consisting of oxygen, water, nitrogen, methane, ethane, ethylene, propane, carbon tetrafluoride and sulfur hexafluoride.

21. The window of claim 18, wherein said fill gas has a density of about 3.6 Kg/m$^3$, a thermal conductivity of about 0.009 W/M/°K, and a sonic velocity of about 212 m/sec.

22. The window of claim 18, wherein said fill gas has a density in the range of from about 3.5421 to about 3.6137 Kg/m$^3$, a thermal conductivity in the range of from about 0.00884 to about 0.00902 W/M/°K and a sonic velocity in the range of from about 209.88 to about 214.12 m/sec.

23. A method of making a window fill gas including separating air to form a rare gas stream enriched in krypton and xenon consisting essentially of the steps of:
a) separating oxygen and nitrogen from air in a distillation process and forming said rare gas stream with the following composition:
  krypton—from about 89% to about 95%,
  xenon—from about 5% to about 8%, and
  contaminants—from about 0.5% to about 2%,
  said contaminants including oxygen, water and at least one lower hydrocarbon;
b) catalytically reducing the concentration of said at least one hydrocarbon in said rare gas stream with the formation of water to form a hydrocarbon-lean gas stream;
c) catalytically reducing the concentration of oxygen in the hydrocarbon-lean stream from step (b) to form an oxygen-free gas stream; and
d) drying said oxygen-free gas stream from step (c) to remove water and to form said fill gas with a dew point temperature lower than the expected service temperature of the window and the following composition:
krypton—from about 92% to about 98%,
xenon—from about 2% to about 8%, and
contaminants—less than 0.05%.

24. The method of claim 23, wherein the concentration of krypton and xenon in the gas streams in each of steps (a), (b) and (c) does not substantially exceed that in the window fill gas being formed.

25. The window of claim 17, wherein said fill gas is prepared from said rare gas stream by only catalytic oxidation processes and drying processes.

26. The method of claim 1, wherein said processing of said rare gas stream consists essentially of recited steps (a), (b), (c) and (d).

* * * * *

UNITED STATES PATENT AND TRADEMARK OFFICE
CERTIFICATE OF CORRECTION

PATENT NO. : 5,792,523
DATED : August 11, 1998
INVENTOR(S) : Manus McHugh, III

It is certified that error appears in the above-indentified patent and that said Letters Patent is hereby corrected as shown below:

Item ]56]

On the cover page, insert the following under "References Cited".

--4,874,592   10/1989   Shino et al........... 423/262

FOREIGN PATENT DOCUMENTS

| | | |
|---|---|---|
| 2547617 | 4/1977 | Germany |
| 3015269 | 10/1981 | Germany |
| 1189975 | 4/1970 | Great Britain |
| 3401197 | 7/1985 | Germany |
| 1542205 | 4/1970 | Germany |

OTHER PUBLICATIONS

Purification of Krypton and Xenon, Ikeda, Kenji;
Chemical Abstracts, Vol. 120, No. 16, Abstract No. 195193--

Signed and Sealed this

Second Day of March, 1999

Attest:

Attesting Officer

Q. TODD DICKINSON

Acting Commissioner of Patents and Trademarks